United States Patent
Hönig et al.

(10) Patent No.: US 6,662,914 B2
(45) Date of Patent: Dec. 16, 2003

(54) HYDRAULIC DASHPOT

(75) Inventors: Michael Hönig, Ennepetal (DE); Walter Wirtz, Gevelsberg (DE); Marcello Di Fina, Bochum (DE)

(73) Assignee: Krupp Bilstein GmbH, Ennepetal (DE)

( * ) Notice: Subject to any disclaimer, the term of this patent is extended or adjusted under 35 U.S.C. 154(b) by 0 days.

(21) Appl. No.: 10/212,309

(22) Filed: Aug. 2, 2002

(65) Prior Publication Data

US 2003/0057042 A1 Mar. 27, 2003

(30) Foreign Application Priority Data

Aug. 4, 2001 (DE) .......................... 101 38 487

(51) Int. Cl.[7] ................ F16F 9/48; F16F 9/00; F16F 9/34; F16F 9/516
(52) U.S. Cl. ............... 188/322.15; 188/285; 188/318; 188/322.22
(58) Field of Search ............... 188/322.15, 322.22, 188/318, 285, 266.5, 280, 281, 319.1

(56) References Cited

U.S. PATENT DOCUMENTS

2003/0057042 A1 * 3/2003 Honig et al. ........... 188/322.15

FOREIGN PATENT DOCUMENTS

DE        3608738 A  *  9/1987
EP    001006292 A1  *  6/2000

* cited by examiner

Primary Examiner—Douglas C. Butler
(74) Attorney, Agent, or Firm—Max Fogiel

(57) ABSTRACT

A hydraulic dashpot with a cylinder (1) full of shock-absorbing fluid, with a piston (3) mounted on the end of piston rod (2), traveling back and forth inside the cylinder, separating the cylinder into two compartments (4 & 5), and provided with ports and shock-absorption valves, and with a variable bypass system accommodated in an axial bore (13) in the piston rod provided with lateral radial openings (11 & 26) extending through the rod. The object is to allow fixed independent establishment of the cross-section of the bypass system available for the fluid to flow through as the piston rod travels in the direction associated with the suction phase and of the cross-section of the bypass system available for the fluid to flow through as the piston rod travels in the direction associated with the compression phase. The bypass system is accordingly provided with an axially moving control tube (24) whereof one end comes to rest against one valve assembly (9) and the other end comes to rest against another valve assembly (20) and whereby its axial motion is limited by stops.

5 Claims, 1 Drawing Sheet

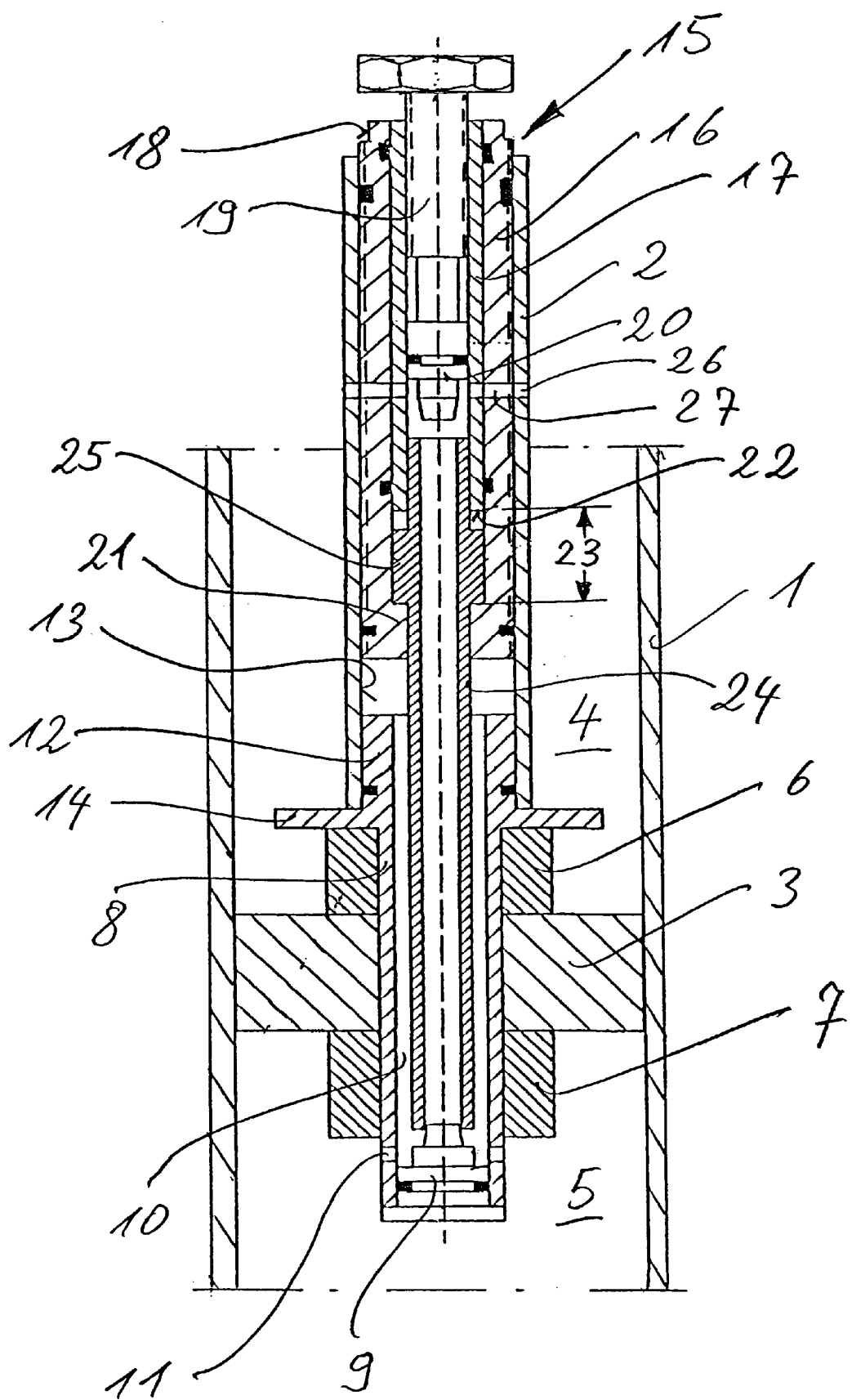

HYDRAULIC DASHPOT

BACKGROUND OF THE INVENTION

The present invention concerns a hydraulic dashpot.

Hydraulic dashpots are preferably employed in motor vehicles to attenuate the motion of wheel suspensions attached by way of springs.

The dashpot includes a cylinder and a piston. The cylinder is full of shock absorbing fluid and divided into two compartments. The motion is attenuated by forcing fluid from one compartment into the other through preferably spring loaded ports in the piston.

A known method of attaining well defined decreased attenuation at low piston speeds is to provide bypasses hydraulically paralleling the ports in the piston and hydraulically connecting the two compartments. Providing the bypasses with variable cross-sections is also known.

European Patent 1 006 292 A1 discloses a dashpot of this genus. The bypass between the compartments is accommodated in an axial bore in the piston rod and provided with lateral outlets through the rod that communicate with each compartment. The piston is hollow and accommodates a rod that adjusts the bypass cross-section. The rod governs controls in the form of a needle valve. There is a drawback to this embodiment in that only a fixed bypass cross section can be attained. Thus, the fluid must flow through the same cross section during the compression phase as it does during the suction phase.

Blocking the bypass to fluid flowing either in one direction during the compression phase or in the other during the suction phase is known, but there is a drawback to this approach in that the flow can be regulated in only one direction.

SUMMARY OF THE INVENTION

The object of the present invention is to eliminate these drawbacks.

The advantages attained by the present invention derive in particular from the simplicity with which a bypass cross-section can be established for each direction of flow independently.

BRIEF DESCRIPTION OF THE DRAWINGS

One embodiment of the present invention will now be specified with reference to the accompanying drawing, wherein the single FIGURE is a section through the dashpot's piston.

DESCRIPTION OF THE PREFERRED EMBODIMENTS

The dashpot includes a fluid-filled cylinder 1. A piston 3 is mounted on one end of a piston rod 2 and travels back and forth inside the cylinder. Piston 3 is provided with unillustrated ports and shock-absorption valves and separates the interior of the dashpot into two compartments 4 and 5.

During the suction phase, the fluid flows out of upper compartment 4 and into lower compartment 5 through piston 3, decelerated by the various ports and valves. During the compression phase on the other hand, the fluid flows in the other direction out of lower compartment 5 and into upper compartment 4 through piston 3.

Piston 3 is fastened by fasteners—washers and nuts for instance—to piston rod 2, which is accordingly provided with an unillustrated outside thread.

Accommodation for the bypass system is provided by an axial, and, in the illustrated embodiment, central, bore 13 through piston rod 2. The lower end of the piston rod 2 in this embodiment is provided with an extension 8. A valve assembly 9 is firmly accommodated inside the lower, entering, end of extension 8. The valve itself functions like a needle valve, blocking access to a bore 10 through the center of extension 8. Above valve assembly 9, radial openings through the wall of the extension provide communication between bore 10 and lower cylinder compartment 5. The upper end of extension 8 is provided with a collar 12 that extends into and is fastened inside the bore 13 in piston rod 2. Just below collar 12, the lower end of piston rod 2 rests against a flange 14 around extension 8.

The upper section of piston rod 2 is provided with an inside thread. An adjustable spacer 15 screws into this section. With the dashpot assembled, spacer 15 comprises an outer tube 16 and an inner tube 17, tightly secured together by the bypass system. The top of spacer 15 is provided with means of adjustment, polygonal head 18 in the illustrated embodiment for example.

The upper end of the bore extending through inner tube 17 and hence of spacer 15 is threaded inside. A setscrew 19 screws into this end. Mounted on the lower end of setscrew 19 is another valve assembly 20. The lower end of the outer tube 16 in spacer 15 is provided with a shoulder 21. Annular space 23 with a longer diameter is left between the lower end 22 of inner tube 17 and shoulder 21. A control tube 24 extends within outer tube 16 against the inner surfaces of inner tube 17 and shoulder 21. Control tube 24 is provided with a collar 25 that is longer than annular space 23 is high. Control tube 24 can accordingly move axially within prescribed limits.

Spacer 15 and piston rod 2 are provided with ports 26 and 27 on the same level below the lowest position of the valve assembly 20 attached to setscrew 19. The interior of spacer 15 communicates with upper compartment 4 through ports 26 and 27.

The distance between valve assemblies 9 and 20 and control tube 24 can accordingly be varied from the end of piston rod 2 by rotating spacer 15 or setscrew 19. The actual distance will be established by the lowest limit of control tube 24, with collar 25 resting against the shoulder 21 in outer tube 16. The axial position of shoulder 21 can accordingly be varied by rotating spacer 15.

The position and level of the ports 26 and 27 that extend through piston rod 2 and spacer 15 are selected to ensure a constantly large enough gap between spacer 15 and upper compartment 4. An annular channel can also be provided around spacer 15 at this point.

In establishing the minimal distance between control tube 24 and the upper valve assembly 20 associated with setscrew 19, control tube 24 rests on its collar 25 against the lower end 22 of inner tube 17. Setscrew 19 can then be rotated to establish the minimal distance between control tube 24 and upper valve assembly 20.

The bypass system in accordance with the present invention accordingly allows the cross-section of the bypass to be varied no matter what direction the piston is traveling in, during either the compression phase or the suction phase. With the piston rod traveling in the direction associated with the suction phase, the pressure in upper compartment 4 is higher than the pressure in lower compartment 5. This situation is depicted in the drawing. The fluid flows not only through piston 3 but also through the bypass system—from upper compartment 4 and into inner tube 17 through ports 26 and 27 and on through radial opening 11 into lower compartment 5 by way of control tube 24 and the annular gap established between the tube and lower valve assembly 9.

As piston rod 2 travels in the direction associated with the compression phase, the pressure in lower compartment 5 will be higher than the pressure upper compartment 4. The fluid now flows out of lower compartment 5 and into extension 8 through radial openings 11. The pressure on the annular face of control tube 24 forces the tube up (in terms of the illustration) until it comes to rest on its collar 25 against the lower end 22 of inner tube 17. The fluid now has free access to the interior of control tube 24. The fluid can now flow out of the control tube and into inner tube 17 through the annular gap established between control tube 24 and valve assembly 20 and into upper compartment 4 through ports 26 and 27.

What is claimed is:

1. A hydraulic dashpot comprising: a cylinder filled with shock-absorbing fluid, with; a piston mounted on an end of a piston rod and traveling back and forth inside said cylinder and separating said cylinder into two compartments; ports and shock-absorption valves, and; a variable bypass system in an axial bore in said piston rod with lateral radial openings extending through said rod said bypass system having a cross-section available for the fluid to flow through as the piston rod travels in a direction associated with a suction phase and the cross-section of the bypass system available for the fluid to flow through as the piston rod travels in a direction associated with a compression phase can be fixedly established independently of each other, said bypass system having an axially moving control tube with one end coming to rest against one of said valves and with another end coming to rest against another of said valves and stops for limiting axial motion of said control tube.

2. A hydraulic dashpot as defined in claim 1, wherein said control tube and comprises at least one subordinate tube that can be mutually displaced and having stops abutted by said collar.

3. A hydraulic dashpot as defined in claim 2, wherein said subordinate tube has threaded sections and being axially displaceable by rotating said threaded sections.

4. A hydraulic dashpot as defined in claim 1, wherein said other valve assembly is axially displaceable.

5. A hydraulic dashpot as defined in claim 4, wherein said other valve is axially displaceable by rotating a threaded section.

* * * * *